Patented Nov. 25, 1947

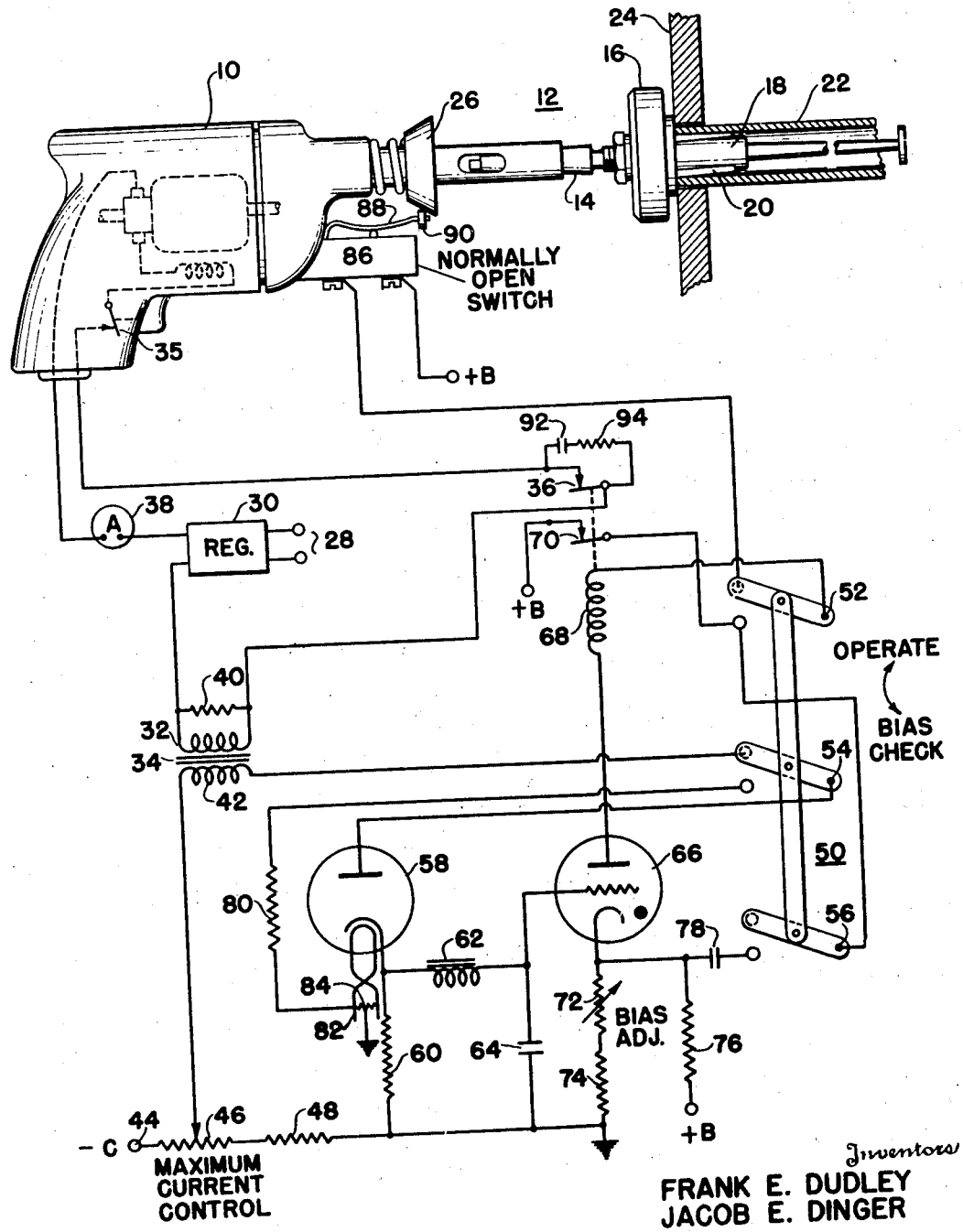

2,431,316

UNITED STATES PATENT OFFICE 2,431,316

ELECTRONIC CURRENT LIMITER SYSTEM FOR MACHINE TOOL MOTORS

Frank E. Dudley, Portsmouth, Va., and Jacob E. Dinger, Washington, D. C.

Application October 31, 1945, Serial No. 625,920

16 Claims. (Cl. 318—476)

(Granted under the act of March 3, 1883, as amended April 30, 1928; 370 O. G. 757)

This invention concerns means for limiting the current supplied to an electric motor, particularly an electric motor used in a machine tool. More specifically this invention relates to means for controlling the current input, hence the torque, of an electric motor used in the rolling or expanding of tubes.

In the manufacture of boilers, condensers and the like, it is necessary to provide a tight joint between tubes and the tube sheet. Originally this was accomplished by a power driven expander without any attempt to control the degree of rolling except such control as the operator could "sense" or "feel" after much experience in the art. The strength of such joints is commonly measured by noting the force required to move the tube axially from the sheet. In the case of tubes rolled without control methods it has been noted that the strength of such joints varies over wide limits.

In order to produce a tight joint it is necessary that the tube be expanded sufficiently to come into intimate engagement with the hole. It is also necessary that the expanding be stopped at the correct point to prevent weakening of the joint by excessive cold working. The optimum point in the rolling process at which time the rolling should be stopped occurs at a particular value of torque depending upon dimensions and composition of tubes and tube sheet. In order to stop the rolling process when this value of torque is reached, it is known to insert a current limiting device in series with the electric motor driving the rolling device. It is also known to use a tapping machine having an automatic transmission or clutch to cause reversal of the output shaft upon withdrawal.

Prior art tube rolling devices have been using an electromagnetic overload relay with a calibration adjustment as the current limiting means. It has been found, however, that the use of such relay is subject to a number of serious disadvantages where uniform results in quantity production are desired. One disadvantage results from the inherent difficulty of accurately calibrating the relay to open at a predetermined current. Available overcurrent relays are subject to an error which is not disadvantageous where such relays are used in their normal protective function but which does affect the results obtained when such relays are used with a tube-rolling device. In addition, the use of a relay incurs the disadvantage that the characteristics of the relay may change greatly because of variations of temperature and because of wear or corrosion of the moving parts. A still further disadvantage of using an overload relay results from the fact that chattering of the contacts occurs upon opening which prevents the current supplied to the motor from being cut off cleanly at the desired point.

It is an object of our invention to provide means for accurately limiting the torque in operations such as tube rolling, tapping, the tightening of nuts and bolts and the like.

In accordance with our invention a tube rolling device is produced which allows for more uniform results than have previously been obtainable.

Also in accordance with our invention a tube roller is produced which is easily calibrated and which will retain its calibration in spite of the passage of time and in spite of variation in ambient conditions.

In accordance with another aspect of our invention, means are provided for immediately and accurately compensating for any change of characteristics between electronic tubes.

Also in accordance with our invention a current limiting device is produced which enables a rapid and complete disconnection of the power source upon passage of a predetermined load current.

Still further in accordance with our invention a tube rolling device is produced which does not require resetting of any control component between successive operations performed by the device.

An additional feature of our invention resides in the fact that the current-responsive means is not affected by the transient current impulses resulting from irregularities of commutation.

The drawing shows a schematic diagram of one embodiment of the electronic control and the method of connection to the tube rolling device. The numeral 10 represents a reversible type hand-operated machine tool commonly known as a tap gun. A tube roller indicated generally by the numeral 12 consists of a tapered mandrel 14, a stationary thrust collar 16 and an expander 18. The expander 18 is equipped with recessed tapered rollers 20 which are forced into contact with the tube 22 upon insertion of the mandrel. This results in the expansion of the end of the tube 22 into intimate contact with the tube sheet 24. Attached to the rotating mandrel is a tapered collar 26 which controls a switching function to be described below.

The current for operating the device 10 is obtained from the source 28 and is preferably passed through a voltage regulator 30. In series with the driving motor are the primary 32 of a current-responsive transformer 34, a trigger switch 35, and the contacts 36 which control the energization of the motor. Also in series with the line we preferably include an ammeter 38. Across the primary winding 32 we include a resistor 40 for the purpose of by-passing the major portion of the current. The latter is preferably of such construction that its resistance is independent of current flow.

At the output winding 42 of the transformer 34 one terminal proceeds to a source of accurately maintained reference voltage 44 through a potentiometer 46. This voltage is preferably in the neighborhood of minus 75 volts. In series with the potentiometer 46 to spread its scale may be included an additional resistor 48. The other end of the secondary winding 42 is connected to an "operate" contact of a triple-pole double-throw switch 50 having switch blades 52, 54, and 56.

By means of switch blade 54, the voltage appearing on transformer winding 42 is applied to the anode of a vacuum diode 58. The cathode circuit of tube 58 is completed through cathode resistor 60. At the cathode of the diode 58 is placed a filter consisting of an inductance 62 and a capacitance 64. The output of the filter is applied to the grid of the grid-controlled gaseous tube 66. In series with the anode of tube 66 is a relay 68 which controls normally-closed contacts 36 and normally-closed contacts 70; the purpose of the latter will be subsequently discussed.

The cathode circuit of the gaseous tube 66 is completed through a variable resistor 72 in series with an additional cathode resistor 74. The variable resistor 72 is used for purposes of adjusting the bias of tube 66. Also connected to the cathode is a resistor 76 leading to the positive supply and a capacitor 78, which is utilized in the process of checking the bias. Also utilized in the "bias check" circuit is the resistor 80 which is connected to a low voltage source, for example the filament supply 82 which is shunted by a grounded center tapped resistor 84.

In series with the winding of a relay 68 and in series with switch blade 52 is placed a normally-opened switch 86 which is preferably of the micro-switch type. This switch is operated by means of a spring biased operating arm 88 which engages the tapered collar 26 by some antifriction means, for example the roller 90. The switch 86 is arranged so that the inward movement of the collar 26 causes the switch contacts to be closed.

In order to prevent sparking of contacts 36 and to encourage a positive breaking of the circuit, we provide a capacitor 92 and a series resistor 94 across the contacts.

A device constructed in accordance with our teachings may be successfully constructed having a wide variation of circuit constants. The following values, referring to the numerals of the drawing, are given merely as examples used in a practical embodiment of our device. No descriptive data are given where the specific design or rating is immaterial or obvious without study.

10—Reversible tap gun
34—Thordarson T19F80 transformer
40—1 ohm, 20 watt resistor
46—100,000 ohm, 25 watt potentiometer
48—50,000 ohm, 20 watt resistor
58—6H6 vacuum diode
60—120,000 ohm, 1 watt resistor
62—Thordarson T-13C27 choke
64—.05 mfd. capacitor
66—884 gaseous triode
72—2,000 ohm wire wound variable resistor
74—2700 ohm, ½ watt resistor
76—27,000 ohm, 1 watt resistor
78—2.5 mfd. capacitor
80—27,000 ohm, 1 watt resistor
92—400 ohm, 2 watt resistor
94—.1 mfd. capacitor In operation predetermined current flowing through the tool produces a corresponding voltage across the secondary of the transformer 34. This voltage is applied in series with a standard negative voltage which is obtained from a constant voltage source 44 of any well known type. When the positive voltage peaks obtained from transformer 34 exceed reference voltage obtained by means of potentiometer 46 by a predetermined amount, current pulses flow through the diode 58 resulting in the application of a signal to the grid of the gaseous tube 66. When the pulses exceed a predetermined amount as determined by the setting of the bias-adjusting resistor 72, the tube 66 breaks down and the grid loses control. Thus a continuous current flows through the relay 68 opening contacts 36 to de-energize the tool.

The specific construction of the transformer 34 deserves comment. In a practical embodiment the primary winding 32 may consist of a low voltage filament winding of a standard receiver type supply transformer and the secondary winding 42 may consist of the high voltage winding of such transformer. Ideally the transformer 34 should produce an output alternating voltage which is directly proportional to the current flowing through the load. Since the transformer 34 supplies very little power to the circuit, saturation of the transformer core may be avoided by placing resistance 40 across the primary.

The operation of the device will be described first under conditions of low current existing during the initial part of the rolling-in process and secondly under conditions where the current slightly exceeds the pre-set tipping or disconnect value. It will be assumed during the following discussion that the switch 50 is in the "operate" position. During the rolling in process the collar 26 is in such position as to close the contacts of switch 86.

When the tool 10 is drawing only a small amount of current, a comparatively low alternating voltage will appear across the secondary 42 of the transformer 34. Under such conditions the peak values of the voltage will not exceed the reference voltage 44 and the anode of the diode 58 will never become sufficiently positive with respect to the associated cathode for current to flow. With no current flowing through the tube 58 the grid of the following tube 66 will be at ground potential. The cathode of the gaseous tube 66 under such circumstances will be positively charged since it is connected to an intermediate point of a potentiometer consisting of resistor 76 in the positive leg and resistors 72 and 74 in the negative leg. Therefore, since the grid is sufficiently negative with respect to the cathode, no current will flow in the anode circuit of the gaseous tube 66. The contacts 36 will therefore remain closed and the tool will continue to operate.

Assume next that the current has increased to the preset tripping point. The current existing at the tripping point is determined by the adjustment of the potentiometer 46. Under such circumstances the positive peaks of the voltage appearing across the secondary 42 of the transformer 34 will exceed the preadjusted reference voltage obtained from the potentiometer 46. The difference between the reference voltage and the positive voltage peaks of the transformer 32 applied between the anode and cathode of the tube 58 will cause pulses of current to flow in this tube. Such pulses of current will cause a voltage to appear across the cathode resistor 60 raising the potential of the cathode of the diode 58 above the ground and applying positive pulses to the grid of the gaseous tube 66. When the peak value of a pulse exceeds the positive voltage at which the tube 66 will start to conduct, "breakdown" occurs, continuous plate current flows and the grid loses control. This causes sustained energization on the relay 68 and the opening of contacts 36 to de-energize the motor.

After the motor is so automatically de-energized the operator withdraws the tool causing translation of the collar 26 to the right and the opening of the contacts of switch 86. This opens the circuit including the winding of relay 68 and causes automatic reclosure of the contacts 36 and 70 and renewed energization of the driving motor. Thus during the time that retraction is taking place, the tube expander will rotate in a reversed direction because of the reversing means included within the tool. After withdrawal the operator may, if desired, release pressure on the trigger switch 35 of the tool to de-energize the motor. The tool is now ready to perform a subsequent rolling operation upon insertion into another tube 22.

Oscillographs of the current drawn by a commutator type motor show current peaks in the form of transient impulses of very steep wave front and of very short duration. Such impulses are effectively prevented from operating the disconnecting means which we describe because of the filtering action of the choke 62 and the capacitor 64.

Due to the opening of switch 86 upon withdrawal of the tool the anode current from the gaseous tube 66 is completely cut off and the tube is restored to its initial no-current condition ready for the next operation. It is important to note that by the use of the switch 86 and the sustained conduction characteristics of the gaseous tube, resetting for a subsequent operation occurs automatically without the necessity of any switching or resetting operation on the part of the operator.

In order to compensate for the variation in the characteristics of various gaseous tubes, even where such tubes are sold as having identical characteristics, bias adjustment is provided. To calibrate the device after the gaseous tube 66 has been replaced, the switch 50 is thrown to the "bias check" position. This switching operation has three functions: First, the anode return through blade 52 is caused to pass through relay contacts 70 on its way to the positive anode supply. Secondly, the cathode-to-anode potential of the diode 58 is caused to be obtained from the substantially constant voltage filament supply 82. Thirdly, a capacitor 78 is shunted from the cathode of gaseous tube 66 to the positive voltage supply through the normally-closed contacts 70 to relay 68.

Since the filament supply is alternating, a pulsating current will flow from the cathode to the anode of diode 58. Such flow will be limited to a predetermined value by the series resistor 80. The pulsating current through cathode resistor 60 results in the application of a pulsating positive voltage on the grid of the gaseous tube 66. To adjust the bias the variable resistor 72 is set so that its resistance is initially high causing the voltage on the cathode to be highly positive. The resistor 72 is then moved in such a direction as to decrease its resistance. A point will be reached at which the positive pulses appearing on the grid will be just sufficient to cause current to flow in the anode circuit. Such current flow will cause the closing of relay 68 which will provide both a visual and audible indication that the proper bias setting has been reached.

In order more definitely to signal the operator that the proper bias setting has been reached, we include means for producing vibratory operation of the relay 68 as conduction in the gaseous tube 66 is initiated. This is accomplished by use of the capacitor 78. Under conditions when no current is flowing in the anode circuit of tube 66, the capacitor 78 will be fully charged, charging current being supplied through resistor 76. However, as the tube breaks down and begins to conduct, the gaseous tube will offer a discharge path for the capacitor 78. The discharge current will flow practically instantaneously through the relay 68 causing contacts 70 to open which will in turn cause conduction through tube 66 to cease. This enables the capacitor 78 to recharge. The reclosing of contacts 70 caused by cessation of the current causes another discharge of capacitor 78 and the cyclic operation of relay 68 at a rate determined by the time constant of the circuit. This is a function of the capacitance of the capacitor 78 and the associated resistance and the inertia of the relay armature.

If it is assumed that the gaseous tube has been replaced and that the variable resistor 72 has been set at the upper point of calibration as described above, it remains to calibrate the potentiometer 46 in terms of the work to be accomplished. This may be done by using the following procedure: Assuming that a tube 22 of a given cross-section and of a given material is to be expanded into a given tube sheet. Potentiometer 46 is set at an arbitrary point on the scale and a tube expanded in the normal manner. If the finished job shows evidence that the tube is loose in the hole because of underexpansion the tripping or cut off current is increased. This is accomplished by moving the potentiometer 46 in such a direction as to increase the D. C. voltage appearing between the movable contact of the potentiometer and the ground of the circuit. In the event that the joint shows evidence of overexpansion and excessive cold working, the movable contact of potentiometer 46 is moved slightly in the opposite direction. Thus a potentiometer setting which produces satisfactory rolled joints under the given set of conditions may be determined. The accuracy of this setting may be confirmed by applying axial pressure to the rolled tube and noting whether the force required to separate the tube 22 from the tube sheet 24 is a maximum as compared to tubes rolled with the potentiometer 46 at settings above and below the selected point. In like manner other settings may be found for the potentiometer 46 which correspond to other working conditions. Where additional electronic control units are to be produced, it is not necessary to repeat this procedure but only to calibrate the pointer of the potentiometer 46 for the desired tripping values of current which may be noted at the time of the calibration of the initial unit.

It is of course necessary that the standard source of negative potential 44 may be maintained accurately. This may be accomplished by using any one of a number of types of electronic voltage regulators well known in the art. It is possible by use of known methods to provide a source of constant voltage which within limits is independent of line voltage and which is maintainable within plus or minus a fraction of a volt.

While we have shown and described our device with particular emphasis on the application of tube rolling, it will be seen that our device is also applicable to limit current or torque in other applications. For example, where this control is used for tapping threaded holes the device will prevent breakage of expensive taps and injury to the material being worked upon. Our device is also applicable to tightening nuts and bolts and for many other applications requiring immediate removal of power upon attainment of a predetermined torque.

We have found that the use of a condenser discharged through the relay to provide "buzzer" action gives a satisfactory audible indication that the proper setting of resistor 72 has been reached. It will be apparent that other types of indication might be used, for example a lamp controlled by an auxiliary set of contacts on the relay 68.

While we have shown the use of a vacuum diode and a gaseous triode to perform the control function it will be apparent to one skilled in the art that other combinations of tubes may be used in accordance with our teachings. Thus, we do not wish to restrict ourselves to the use of the particular tubes described.

The voltage used to determine the setting of the variable resistor 72 is obtained from the filament supply in the embodiment shown. It will be apparent that this voltage could also be advantageously obtained from any other fairly constant low voltage source.

While the invention has been discussed with particular reference to the use of an A. C. supply, our teachings are equally applicable where the current supply is D. C. In the latter case it would be necessary to substitute for the transformer 44 an arrangement for stepping up the D. C. voltage appearing across resistor 40 to a proportionally higher value of the proper polarity to oppose the voltage supplied through terminal 44. Such a D. C. step-up device may readily be constructed by one skilled in the art using well known techniques; thus it is not necessary to describe an embodiment of such device herein.

Typical results obtainable through use of our device were determined by noting the push out force required for a large number of rolled joints. It was found that much greater uniformity could be obtained using the device disclosed. The mean divergence from the average force was found to be 33% better than when the overcurrent relay type of control was used. Use of our method provides uniformity not obtainable by use of prior art tube-roll devices.

The improved accuracy over prior art devices is due in large measure to the fact that the current through the relay is either a maximum or zero. On the other hand, where an overcurrent type of device is used, intermediate values of current are present at all times, and the relay is called upon to discriminate between currents which are practically of the same magnitude. In the latter case even a carefully built relay will not be free of chattering and indecision in the region of current values where load disconnection is required.

It will be seen from the above that we have produced an accurate, positively acting current-limiter. It will also be seen that the calibration of the device may be easily and simply accomplished and that such calibration will be maintained over long periods of time. It is further seen that the device which we describe is automatically resetting, thus making it unnecessary for the operator to give attention to the mechanics of control once the potentiometer 46 has been set for the work to be accomplished. It is still further seen that means are provided for making the device unaffected by short duration transient impulses caused by commutation or line disturbances.

While the invention is susceptible of various modifications and alternative constructions, it is to be understood that we do not intend to limit the invention by such disclosure for we aim to cover all modifications and alternative construction falling within the spirit and scope of the invention as defined in the appended claims.

The invention described herein may be made and used by or for the Government of the United States for governmental purposes without the payment to us of any royalties thereon or therefor.

What we claim is:

1. A current limiter for a machine tool using an electric motor comprising: means to produce a first voltage which is a function of the motor current; a source of constant direct-current voltage; means to compare the peak value of said first voltage with said constant voltage; and means energized in response to a predetermined difference between said voltages to deenergize said motor.

2. A current limiter for a machine tool using an electric motor comprising: a transformer having a primary and secondary, said primary winding in series with said motor; a direct-current source of substantially constant voltage; means to compare the peak value of the alternating voltage existing across said secondary winding with said constant direct voltage; and means energized in response to a predetermined difference between the peak value of said secondary voltage and said constant voltage to disconnect said motor from its current source.

3. A current limiter for a machine tool having an electric motor drive comprising: means to produce a first voltage which is a function of the current flowing through said motor; a source of voltage of known magnitude; a vacuum tube containing an anode and cathode; means for applying the difference between said voltages between said anode and cathode; a gaseous tube containing a grid, said grid excited by the output signal of said vacuum tube; said gaseous tube arranged to break down and become conducting upon application to the grid of a positive pulse exceeding a predetermined value; and means associated with said gaseous tube and with said motor whereby the circuit supplying said motor is disconnected upon said gaseous tube becoming conducting.

4. A current limiter for a machine tool having an electric driving motor comprising: a transformer having a primary and a secondary, said primary included in said motor circuit, said secondary producing a voltage which is a direct function of the current being supplied to said motor; a regulated voltage source producing a constant voltage of known magnitude; means for extracting the difference of said voltages; a gaseous control tube having a cathode, an anode and a control grid, connections for impressing a signal corresponding with said difference of voltages to control said grid; a source of bias voltage acting on said grid to allow current to flow in the anode circuit of said tube only when the signal applied to said grid exceeds a predetermined value; and disconnect means controlled by said anode current to deenergize said motor when the current flowing through said motor exceeds a predetermined value.

5. A current limiter for a machine tool driven by an electric motor comprising: means to produce a first voltage which is a function of the instantaneous current drawn by said motor; a voltage source having a substantially constant voltage; means to compare said first voltage with the voltage of said constant voltage source; a gaseous tube excited by the output of said voltage-comparing means, and electrical means controlled by the output of said tube to disconnect said motor from a current source when the output of said voltage comparing means exceeds a predetermined value.

6. A current limiter for a machine tool having an electric motor drive comprising: a power source supplying said motor; means associated with said power source to produce a first voltage which is a function of the current flowing through said motor; a regulated voltage source producing a relatively constant second voltage; means to obtain the difference between said first and second voltages; a gaseous tube having an anode, a cathode and a control grid, said voltage difference being applied to said control grid, said tube biased to conduct anode current when the signal applied to said grid exceeds a predetermined value; and a relay associated with said anode controlling the current to said motor whereby said motor is disconnected from said power source upon the passage of motor current exceeding a predetermined value.

7. The subject matter as claimed in claim 6, said machine tool including a switch in the anode circuit of said tube and effective upon retraction of said machine tool from the work to interrupt the current flowing in the circuit of said anode whereby said gaseous tube is restored to the nonconducting condition.

8. A current limiter for a machine tool having a commutator type of electric motor comprising: means to produce a first voltage which is a function of the current flowing through said motor, a second voltage source of constant predetermined voltage, a vacuum tube having an anode and a cathode, means to apply the difference between said first voltage and second voltage between said anode and said cathode to cause a flow of anode current which is a function of said voltage difference; a gaseous tube including a control grid excited by the output of said vacuum tube; a filter between the output of said vacuum tube and the grid of said gaseous tube whereby transients of high frequency due to commutation are ineffective improperly to excite said grid; and a motor disconnect switch controlled by said gaseous tube and associated with said motor to deenergize it upon passage of motor current exceeding a predetermined value.

9. A current limiter for a machine tool having an electric motor drive comprising: a transformer having a primary and a secondary, said primary being in series with said motor, said secondary producing an alternating voltage which is a function of the alternating current flowing through said primary; a source of direct voltage in series with said secondary; a gaseous control tube including a grid controlled by said voltages, said grid causing conduction to take place in said tube when the positive peak of voltage of said secondary exceeds the voltage of said direct voltage source; and motor disconnect means associated with said gaseous tube and responsive to the current flow therein, said direct voltage source being adjustable whereby said motor disconnect means can be caused to operate at a predetermined value of motor current.

10. In a line current limiter of the type utilizing a grid-controlled gaseous tube having an anode, cathode and control grid wherein the voltage applied to said grid is a function of line current and wherein a predetermined grid voltage is effective to cause current flow in said tube comprising: bias checking means including a source of relatively constant voltage; means to apply said voltage to the grid of said gaseous tube, an adjustable source of grid bias associated with said tube, and current-responsive means in the circuit of said anode to indicate the beginning of anode current flow as said bias is decreased to the point where said constant voltage source is effective to cause said tube to become conducting.

11. In a line current limiter of the type having a gaseous control tube wherein the voltage applied to the grid of said control tube is a function of the current flowing in said line and wherein a relay controlled by said tube is effective to interrupt the flow of said current upon the attainment by said current of a predetermined value comprising: bias checking means including means to apply to said grid a voltage of predetermined magnitude; an adjustable source of bias for said tube whereby with said known voltage applied to said grid a point of adjustment of said grid bias may be determined which is just sufficient to cause said tube to conduct; and auxiliary means associated with said relay to inform an operator that a desired point has been reached.

12. A current limiter for a machine tool having an electric motor drive comprising: means to produce a voltage which is a function of the current drawn by said motor; a gaseous control tube having a cathode, an anode and a control grid, said voltage being effective to cause anode current to flow upon attainment of a predetermined value; relay means in the circuit of said anode effective to disconnect said motor upon flow of anode current; a normally-open switch mounted on said machine tool including contacts in series with said anode circuit; and switch-operating means mounted on said machine tool for closing said switch upon engagement of the tool with the work and for opening said switch upon the removal of said tool from the work, whereby said tube becomes non-conducting in readiness for subsequent use.

13. The subject matter as claimed in claim 12, said switch operating means being effective to close said switch and apply anode voltage to said tube when axial pressure is applied forcing said tool into engagement with said work.

14. An electronic system for abruptly, positively and consistently interrupting the circuit of a machine tool motor when its torque attains a predetermined fixed magnitude comprising a motor-control relay external to said motor circuit, a tube having said relay in its anode circuit, grid-biasing means normally precluding flow of anode current through said relay, means including a rectifier for deriving from the motor current unidirectional voltage pulses poled to overcome said biasing means, and a source of constant voltage poled to preclude conduction by the rectifier until said pulses to predetermined extent exceed said constant voltage.

15. An electronic system for abruptly, positively, and consistently interrupting the circuit of a machine tool motor when its torque attains a predetermined fixed magnitude comprising a motor-control relay external to said motor circuit, a tube having said relay in its anode circuit and having in its grid circuit a resistor in series with a source of biasing voltage normally precluding flow of anode current through said relay, and means for overcoming said biasing voltage comprising a loop circuit excluding said source of biasing voltage and including in series said resistor, a rectifier, a source of voltage proportional to the motor current, and a source of constant unidirectional voltage which precludes conduction by the rectifier until said proportional voltage to predetermined extend exceeds said constant voltage.

16. An electronic system for abruptly and positively interrupting the circuit of a machine tool motor when its torque attains a predetermined magnitude and for reclosing said circuit upon retraction of the tool from the work comprising a motor-control relay having its normally deenergized coil external to said motor circuit and having normally-closed contacts, a switch mounted and constructed for closure when the tool is pressed against the work and for opening when the tool is retracted, a gaseous-discharge tube having said switch and coil in its anode circuit, grid-biasing means normally precluding flow of anode current of said tube, means including a rectifier for deriving from the motor current unidirectional voltage pulses poled to overcome said biasing means, and a source of predetermined constant voltage poled to preclude conduction by said rectifier until said pulses to predetermined extent exceed said constant voltage.

FRANK E. DUDLEY.
JACOB E. DINGER.

REFERENCES CITED

The following references are of record in the file of this patent:

UNITED STATES PATENTS

| Number | Name | Date |
|---|---|---|
| 878,855 | Barnum | Feb. 11, 1908 |
| 1,733,074 | Reicke | Oct. 22, 1929 |
| 2,175,889 | Forbes | Oct. 10, 1939 |
| 2,295,297 | Schneider | Sept. 8, 1942 |
| 2,355,852 | Fisher | Aug. 15, 1944 |
| 2,361,172 | Brown | Oct. 24, 1944 |